United States Patent [19]
Hokari et al.

[11] Patent Number: 5,389,749
[45] Date of Patent: Feb. 14, 1995

[54] ELEVATOR SYSTEM

[75] Inventors: Sadao Hokari; Kiyoshi Nakamura; Hiromi Inaba, all of Katsuta; Yoshio Sakai, Ibaraki; Hideaki Takahashi, Katsuta; Seikichi Masuda, Hitachi; Takei Ando, Ibaraki; Toshiaki Kurosawa, Katsuta; Akihiro Nokita, Mito; Masahiro Konya, Katsuta, all of Japan

[73] Assignees: Hitachi, Ltd.; Hitachi Building Systems Engineering And Service Co., Ltd., both of Tokyo, Japan

[21] Appl. No.: 906,225

[22] Filed: Jun. 24, 1992

[30] Foreign Application Priority Data

Jul. 24, 1991 [JP] Japan .................................. 3-184325

[51] Int. Cl.⁶ ......................... B66B 1/06; B66B 1/28; H02P 7/42; H02P 7/00
[52] U.S. Cl. .................................. 187/293; 318/800; 318/432; 318/105
[58] Field of Search ............... 187/112, 114, 115, 118; 303/71, 95, 96, 97, 98; 318/800, 801, 805, 798, 807, 809, 482, 105, 110, 440, 83, 81, 66, 69, 84

[56] References Cited

U.S. PATENT DOCUMENTS

| | | | |
|---|---|---|---|
| 3,891,064 | 6/1975 | Clark | 187/118 |
| 4,349,772 | 9/1982 | Weiss | 318/799 |
| 4,426,611 | 1/1984 | Espelage et al. | 318/803 |
| 4,516,665 | 5/1985 | Watanabe | 187/29 R |
| 4,602,198 | 7/1986 | Weiss et al. | 318/798 |
| 4,995,478 | 2/1991 | Oshima et al. | 187/115 |
| 5,077,508 | 12/1991 | Wycoff et al. | 318/436 |
| 5,099,186 | 3/1992 | Rippel et al. | 318/803 |
| 5,142,468 | 8/1992 | Nerem | 363/71 |
| 5,241,141 | 8/1993 | Cominelli | 187/116 |

Primary Examiner—Steven L. Stephan
Assistant Examiner—Robert Nappi
Attorney, Agent, or Firm—Antonelli, Terry, Stout & Kraus

[57] ABSTRACT

An elevator system which is provided with power converters, electric motors supplied with power from the power converters, and a torque distributing section having functions for determining allocation of output power from the power converters on the basis of a required torque, by which an elevator is operated on the basis of functions selected in accordance with the operation mode. The system is able to save power in the elevator operation and also improve control functions and increase system capacity.

11 Claims, 8 Drawing Sheets

| JUDGEMENT CONDITIONS | | | FUNCTION | |
|---|---|---|---|---|
| | | | DRIVING SYSTEM A TORQUE COMMAND [$\tau_A^*$] | DRIVING SYSTEM B TORQUE COMMAND [$\tau_B^*$] |
| NORMAL OPERATION MODE | CURRENT CONDUCTION | TEMPERATURE EQUALIZATION | $T_A \leq T_B$ |  $\tau_A^*$, F1, $\tau^*$ |  $\tau_B^*$, F2, $\tau^*$ |
| | | | $T_A > T_B$ |  F2 |  F1 |
| | | TORQUE RIPPLE SUPPRESSION | |  F3 | |
| ABNORMAL (RESCUE) OPERATION MODE | FAILURE | FAULT IN DRIVING SYSTEM A | | F5(=0) |  F4 |
| | | FAULT IN DRIVING SYSTEM B (A IS NORMAL) | |  F4 | F5(=0) |
| | POWER INTERRUPTION | FAULT IN DRIVING SYSTEM A | | F5(=0) |  F4 |
| | | FAULT IN DRIVING SYSTEM B (A IS NORMAL) | |  F4 | F5(=0) |

ELEVATOR SYSTEM

BACKGROUND OF THE INVENTION

The present invention relates to an improvement of an elevator system, and particularly relates to an elevator system adapted for high speed and large capacity.

DESCRIPTION OF RELATED ART

In general, an elevator driving system comprises a motor for driving an elevator cage, a power converter made to operate in conjunction with the motor, and a controller for controlling the power converter.

In the conventional elevator driving system, the capacity of the motor is mainly decided on the basis of the elevator velocity and the cage load capacity. As the velocity increases or as the load capacity increases, the capacity of the motor increases.

Accordingly, an elevator driver adapted for a so-called high-speed or superhigh-speed elevator requires a driving system constituted by a large-capacity motor and a large-capacity power converter made to operate in conjunction with the motor.

In a transistor converter and a transistor inverter used in the power converter, however, there is a limitation upon element capacity. There have been therefore proposed various multi-drive systems, each constituted by a plurality of small-capacity motors and a plurality of power converters paired with the small-capacity motors.

JP-A-56-3263 discloses an elevator driving system having a plurality of sheaves and a plurality of inverters paired with the sheaves, wherein the inverters are controlled with a phase difference to prevent overlapping of torque ripples produced in the respective motors to thereby attain ripple suppression throughout the entire system.

JP-A-2-228288 discloses an elevator system, in which two driving systems having induction motors supplied with power from two converters/inverters are combined through direct connection of the motors to thereby drive an elevator sheave, so that an unbalanced torque based on the weight difference between the elevator cage and the balancing weight is allocated to one of the driving systems while a torque required for acceleration/deceleration of the elevator is allocated to the other driving system.

JP-A-3-36991 discloses an elevator driving system comprising induction motors having two coils, and inverters respectively connected to the two coils, in which an elevator is operated by the two inverters and the two motors at a normal time, but, when any fault arises in either inverter, the elevator is operated by the conventional pairing of an inverter and motor.

Each of such systems is now called "a multi-drive systems".

In the conventional technique in which the multi-drive system is applied to the elevator driving system, both high speed and large capacity of the elevator can be provided easily. However, in the multi-drive systems there arises a problem in that consumed electric power necessary for driving the elevator becomes large.

That is, in the former reference for example, since the two driving systems are designed to always be in operation, there is a case where the two driving systems may operate in a region in which the respective efficiencies of both of the driving systems are poor. In the latter reference, the output torque from one motor may cancel out the output torque from the other motor according to the relationship between the load condition and the running direction. In such cases, the problem arises in that the quantity of consumed electric power becomes very large.

SUMMARY OF THE INVENTION

It is therefore an object of the present invention to provide an elevator system using a multi-drive system to thereby easily attain improvements by increasing system capacity, power efficiency, riding comfort and reliability.

In addressing the above problem, according to an aspect of the present invention, there is provided an elevator system which comprises: a plurality of power converters; an electric motor supplied with power from the power converters; an elevator driven by the motor; means for generating a velocity command; means for detecting a rotation velocity of the motor; means for generating a torque command including a component in accordance with a deviation of a detected value of the rotation velocity from the velocity command; and means for determining allotment of power outputs among the power converters in accordance with the magnitude of the torque command.

According to another aspect of the present invention, there is provided an elevator system which comprises: two power converters; an electric motor supplied with power from the power converters; an elevator driven by the motor; means for calculating a required torque; means for controlling one of the power converters in accordance with the required torque when the required torque is not larger than a predetermined value; and means for controlling the two power converters in accordance with the required torque when the required torque is larger than the predetermined value.

In the aforementioned configurations, when the required torque is so small that the elevator can be sufficiently driven by only a portion of all the driving systems, only part of the driving systems is operated, and when the required torque is relatively large, all of the driving systems are operated. Accordingly, it is possible to drastically reduce the occurrence of driving systems being operated in parallel in their respective poor-efficiency regions, so that it is possible to reduce power consumption.

Above and other features and effects of the present invention will become clear in description of the preferred embodiments.

BRIEF DESCRIPTION OF THE DRAWINGS

FIGS. 1-A through 1-C is a general diagram of an elevator system showing an embodiment of the present invention;

DESCRIPTION OF THE PREFERRED EMBODIMENTS

Figure 1:
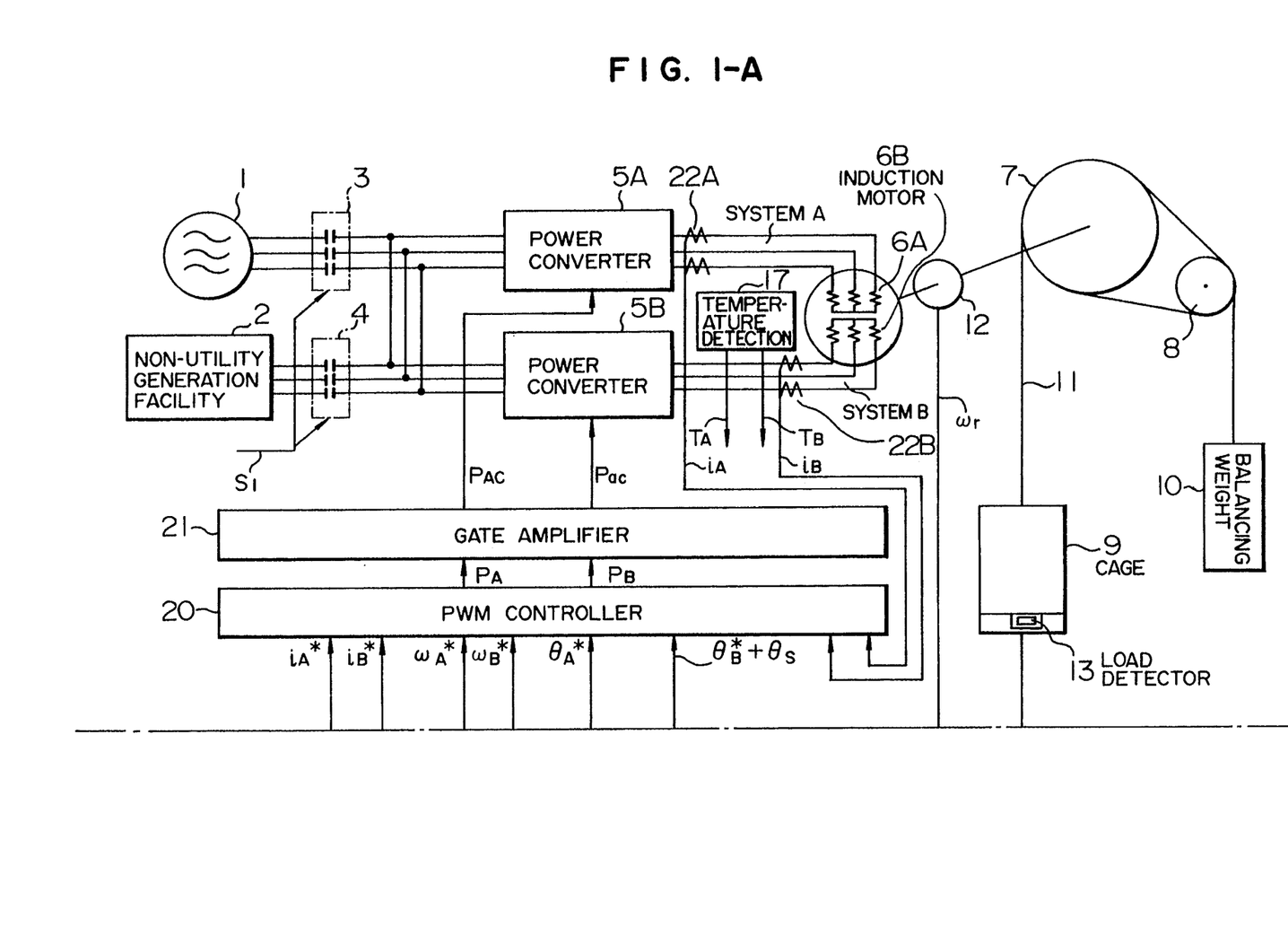

Referring now to FIG. 1, there is shown an embodiment of the elevator system according to the present invention, in which two driving systems are provided.

In the elevator system shown in FIG. 1, there are provided an AC power source 1, and a non-utility generation facility 2 which serves as a power source upon service interruption of the AC power source 1. Contactors 3 and 4 are connected to the AC power source 1 and the non-utility generation facility 2 so as to change over the connection of the AC power source 1 and the non-utility generation facility 2.

Two power converters 5A and 5B are connected to the AC power source 1 and the non-utility generation facility 2 through the respective contactors 3 and 4 so that each of the power converters 5A and 5B converts power supplied from a selected one of the AC power source 1 and the non-utility generation facility 2 into variable voltage variable-frequency AC power. Two induction motors 6A and 6B are supplied with power from the power converters 5A and 5B respectively. Thus two elevator driving systems A and B are constituted by a combination of the power converter 5A and the motor 6A and combination of the power converter 5B and the motor 6B, respectively.

A sheave 7 is connected to the motors 6A and 6B. A rope 11 is laid over the sheave 7 so that an elevator cage 9 and a balancing weight 10 are suspended at the respective opposite ends of rope 11.

A velocity detector 12 is connected to the sheave 7 to thereby detect the velocity of the elevator to generate a velocity signal $\omega_r$. A load detector 13 is provided on the cage 9 so as to detect the load imposed on the cage 9 to generate a load signal $W_L$. An elevator velocity command generator 14 is provided to generate a velocity command $\omega_r^*$ for the elevator.

A fault detector 15 is provided so as to generate a fault signal 15A when the fault detector 15 detects any fault in the driving system constituted by the power converter 5A and the motor 6A, and also generate a fault signal 15B when any fault is detected in the driving system constituted by the power converter 5B and the motor 6B. A power supply failure detector 16 is provided so as to generate a power supply failure signal 16S upon service interruption of the AC power source 1. A temperature detector 17 is provided to detect the coil temperatures of the respective motors 6A and 6B to thereby generate temperature signals $T_A$ and $T_B$ with respect to the motors 6A and 6B.

A mode setter 18 is provided to set either one of the elevator operating modes, in accordance with importance attached thereto, of vibration suppressing and power saving respectively. When much importance is attached to vibration suppressing, the mode setter 18 generates a mode set signal 18S by turning on a switch.

A speed control system 19 is provided to calculate control quantities $i_A^*$, $i_B^*$, $\omega_A^*$, $\omega_B^*$, $\theta_A^*$ and $\theta_B^*+\theta_s$ for controlling the driving systems on the basis of the velocity command $\omega_r^*$, the velocity signal $\omega_r$, the load signal $W_L$, a group of state signals 15A, 15B, 16S, 18S, $T_A$, $T_B$, etc.

The speed control system 19 may be constituted by a microcomputer including a microprocessor, a memory and an input-output device. In FIG. 1, however, the speed control system 19 is expressed as a configuration of a plurality of function blocks, that is, an automatic speed regulating section (ASR section) 191, a torque distributing section 192, a mode determining section 193, a mode selecting section 194, a driving system selecting section 195, a vector control arithmetic operation section 196, and a phase difference setting section 197.

The configuration of the speed control system 19 will be described hereunder as to the respective functional sections.

The automatic speed regulating section (ASR section) 191 calculates the deviation of the velocity signal $\omega_r$ from the velocity command $\omega_r^*$ so as to generate a torque command $\tau^*$ for instructing the quantity of torque required for driving the elevator, taking the load signal $W_L$ into consideration. The torque distributing section 192 has functions $F_1$ to $F_5$ for determining the torque quantities to be output from the two driving systems. The functions will be described later in detail.

The mode determining section 193 determines the operation mode on the basis of the input signal. The mode selecting section 194 and the driving system selecting section 195 are set by the mode determining section 193 so that the mode selecting section 194 selects one group from the group of functions $F_1$ and $F_2$, the group of a function $F_3$ and the group of functions $F_4$ and $F_5$, and the driving system selecting section 195 selects one of the driving systems so that the function group selected by the mode selecting section is assigned to the driving system. In FIG. 1, $\tau_A^*$ represents a torque command for the driving system A constituted by the power converter 5A and the motor 6A, and $\tau_B^*$ represents a torque command for the driving system B constituted by the power converter 5B and the motor 6B.

The vector control arithmetic operation section 196 calculates vector control quantities for controlling the respective driving systems on the basis of the torque commands $\tau_A^*$ and $\tau_B^*$ and the velocity signal $\omega_r$. That is, the vector control arithmetic operation section 196 calculates current commands $i_A^*$ and $i_B^*$ for instructing the magnitude of currents to be supplied from the power converters to the respective motors and frequency commands $\omega_A^*$ and $\omega_B^*$ and phase commands $\theta_A^*$ and $\theta_B^*$ corresponding to the current commands. In FIG. 1, $i_A^*$, $\omega_A^*$ and $\omega_A^*$, which are calculated on the basis of the torque command $\tau_A^*$ and the velocity signal $\omega_r$, are vector control quantities for controlling the driving system A constituted by the power converter 5A and the motor 6A, while $i_B^*$, $\omega_B^*$ and $\theta_B^*$, which are calculated on the basis of the torque command $\tau_B^*$ and the velocity signal $\omega_r$, are vector control quantities for controlling the other driving system B constituted by the power converter 5B and the motor 6B.

The phase difference setting section 197 sets a phase difference $\theta_s$ between the output currents from the power converters 6A and 6B. Torque ripples caused by the motors can be suppressed by providing such a phase difference. This point will be described later in detail.

The speed control system 19 has the aforementioned functions.

In FIG. 1, a pulse width modulation controller (PWM controller) 20 generates a pulse width modulation signal (PWM signal) on the basis of the vector control quantities output from the speed control system 19, and a gate amplifier 21 generates a gate pulse signal on the basis of the PWM signal. Current detectors 22A and 22B are provided so as to feed-back the respective currents $i_A$ and $i_B$ from the power converters 5A and 5B to the PWM controller 20.

The whole schematic configuration of the elevator control system has been described above.

The functions $F_1$ to $F_5$ in the torque distributing section 192 and the operation of the phase difference setting section 197 will be described hereunder. Although each of the functions $F_1$ to $F_5$ originally must have a bipolar characteristic as adapted for four quadrant motor torque control, only a positive polarity region (first quadrant) in each of the functions is shown in FIG. 1 to explain the basic function thereof. As a matter of fact, each of the functions has a symmetric characteristic in the negative polarity region (third quadrant).

The functions $F_1$ and $F_2$ will be described now. The functions $F_1$ and $F_2$ are set in advance so as to be adapted for the power-saving operation of the elevator.

Figure 2A:
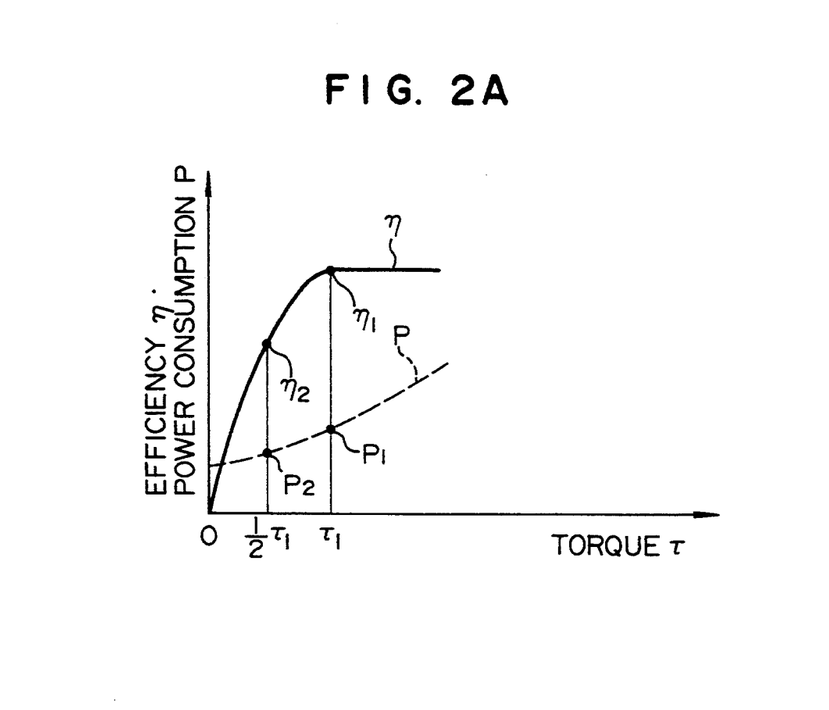
FIGS. 2A and 2B are graphs showing results of comparison of electric power consumption.

The motor efficiency $\tau$ generally has such characteristics as shown in FIG. 2A. That is, the efficiency is low in the region in which output torque is small, while it becomes high as the output torque increases so that, finally, it is saturated at a predetermined value. On the other hand, consumed power P has a characteristics as shown by the broken line in FIG. 2A.

Figure 2B:
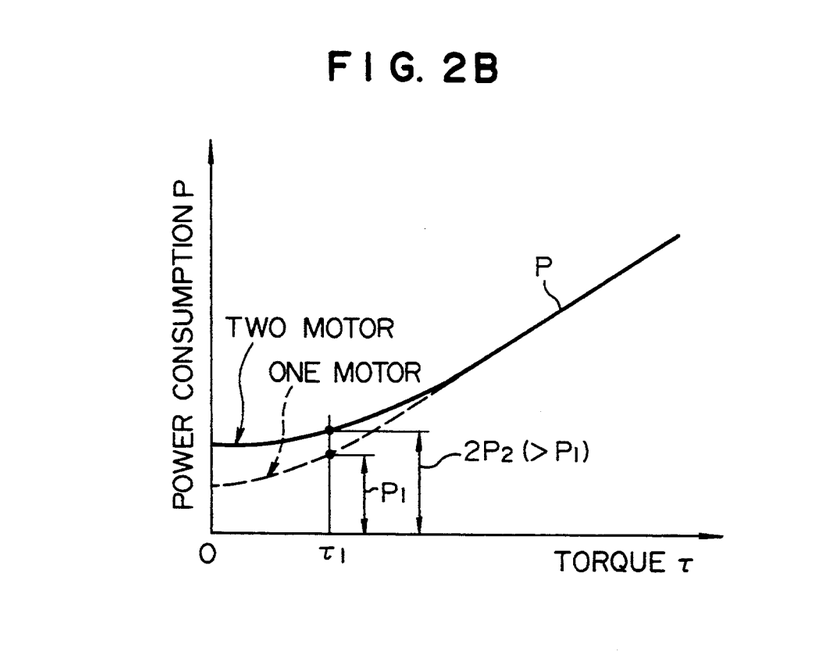

FIG. 2B shows consumed power in the case where two motors having the aforementioned characteristics are used to generate equal torques.

As is obvious from FIGS. 2A and 2B, in the low torque region, power consumed when the elevator is driven by one motor is less than power consumed when the elevator is driven by two motors.

That is, when a torque $(\tau_1/2)$ is output using two motors, a torque $(\tau_1 2)$ is output from each of the motors. It is apparent from FIG. 2A that the efficiency $\eta_2$ in the torque $\eta_1$ is higher than the efficiency $\eta_2$ in the torque $(\tau_1/2)$. Accordingly, the relation $P_1 < 2.P_2$ is established when consumed power $P_1$ in one motor is compared with consumed power $2.P_2$ in the two motors. Consequently, in the low torque region, power consumed when the elevator is driven by one motor is less than power consumed when the elevator is driven by two motors.

In this embodiment, therefore, the two functions $F_1$ and $F_2$ are used so that not only the elevator be driven by one motor in the low torque region but it can also be driven by two motors in the high torque region.

That is, as shown in FIG. 1, the function $F_1$ is set so that the output torque is proportional to the torque command $\tau^*$ in the region in which the required torque is small, while the output torque takes a predetermined value in the region in which the required torque is large.

On the other hand, the function $F_2$ is set so that the output torque is zero in the region in which the required torque is small, while the output torque is proportional to the torque command $\tau^*$ in the region in which the required torque is large. As a result, the elevator is driven by using the first driving system A when the required torque is not larger than $\tau_1$, and, on the contrary, the elevator is driven by the assistance of the second driving system B while keeping the first driving system A full when the required torque is larger than $\tau_1$.

The allotment of torque can be determined by the functions $F_1$ and $F_2$, so that power saving can be attained.

The functions $F_4$ and $F_5$ will be described hereunder. The functions $F_4$ and $F_5$ are functions used for the rescue operation of the elevator when power supply service is interrupted or when any fault arises in either one of the driving systems.

The functions $F_4$ and $F_5$ used when power supply service is interrupted will be described now. When power supply service is interrupted, the elevator is generally stopped immediately, so that a rescue operation can be carried out to move the elevator to the nearest floor in the direction of lighting of the load and at a low speed. In this case, as described previously, the power consumed increases when the elevator is driven by two motors. Accordingly, the non-utility generation facility used at the time of power supply failure requires a large capacity. Therefore, to use a small-capacity non-utility generation facility at the time of power supply failure, the elevator is driven by one motor so that the elevator can be operated efficiently.

Also when any fault arises in either one of the driving systems, the rescue operation can be made using the other normal driving system. In this case, a torque command is given to one driving system, though the way how to select the driving system will be described later.

Therefore, the function $F_4$ is set to generate a torque corresponding to the torque command $\tau^*$ and the function $F_5$ is set to keep the output torque constantly zero, so that only one driving system is used to drive the elevator.

The phase difference setting section 197 which is effective for suppressing torque ripples produced in the motors and the function $F_3$ will be described hereunder.

Figure 3A:
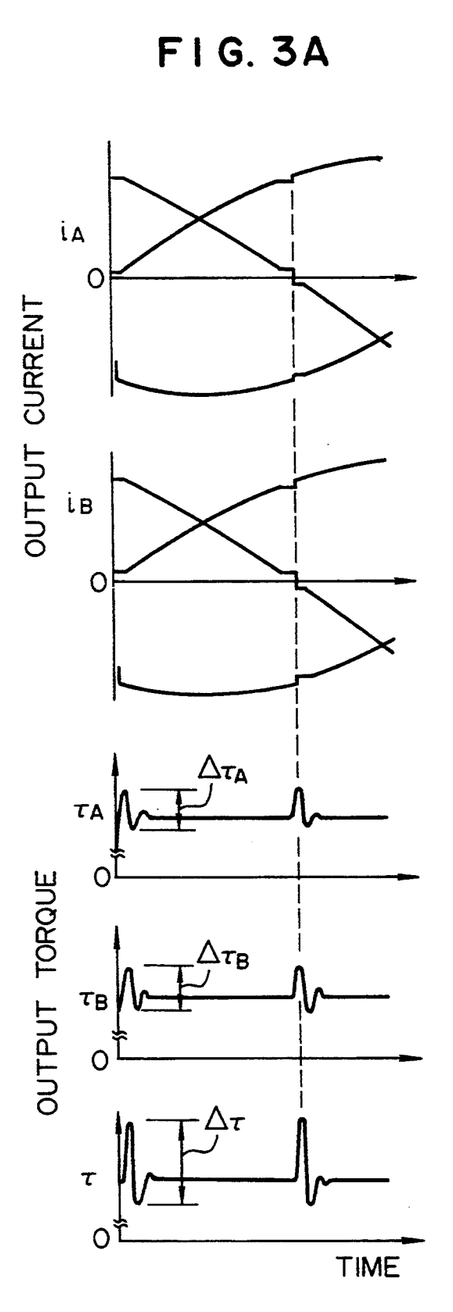
FIGS. 3A and 3B are graphs for explaining torque ripple suppressing control.
Figure 3B:
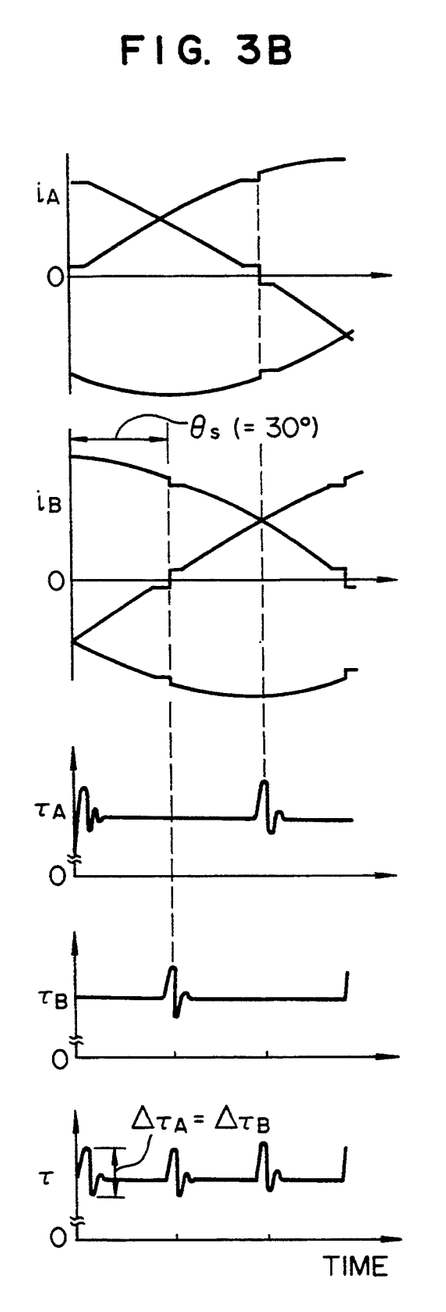

Factors for production of torque ripples will be considered now with reference to FIGS. 3A and 3B.

A current jumping phenomenon contained in the current waveform is known as one factor causing torque ripples. The jumping phenomenon occurs whenever the three-phase output reaches a zero-cross point as shown in FIG. 3A, that is, whenever the electric angle reaches 60°.

When output currents $i_A$ and $i_B$ containing such current jumping are respectively supplied to the motors in the same phase, torque ripples $\Delta \tau_A$ and $\Delta \tau_B$ are produced simultaneously in the motors. Accordingly, large torque ripples $(\Delta \tau)$ are formed by the overlapping of the ripples $\Delta \tau_A$ and $\Delta \tau_B$ respectively produced in the motors.

To suppress the torque ripples, a phase difference is provided between the output currents to avoid the coincidence between the jumping portions of the output currents.

The phase difference $\theta_s$ is stored in advance in the phase difference setting section 197 in FIG. 1. The phase difference $\theta_s$ can be set on the basis of the following expression which shows that a middle point between zero-cross points of one output current coincides with a zero-cross point of the other output current:

$$\theta_s = \pm(60/n + (K \times 60)) \tag{1}$$

in which n represents the number of drives, and K represents a natural number (K=0, 1, 2 . . . . ).

FIGS. 3A and 3B show an example of setting of $\theta_s$ in which $\theta_s$ is set to 30° when n=2 and K=0 are selected.

When a phase difference is provided, controlling is required to allocate a torque equally to the driving systems. To this end, the function $F_3$ is provided.

The control system having the aforementioned configuration operates as follows to thereby carry out the power-saving operation, the rescue operation at the time of occurrence of a fault or at the time of service interruption, the ripple suppressing operation, and the temperature equalizing operation.

When a velocity command $\omega_r^*$ is generated from the velocity command generator 14, the speed control system 19 causes the ASR portion 191 to generate a torque command $\tau^*$ obtained by adding the load signal $W_L$ to the deviation of the velocity signal $\omega_r$ from the velocity command $\omega_r^*$.

On the other hand, the mode determining section 193 determines an operation mode corresponding to the input signal and selects a function corresponding to the operation mode.

Figure 4:
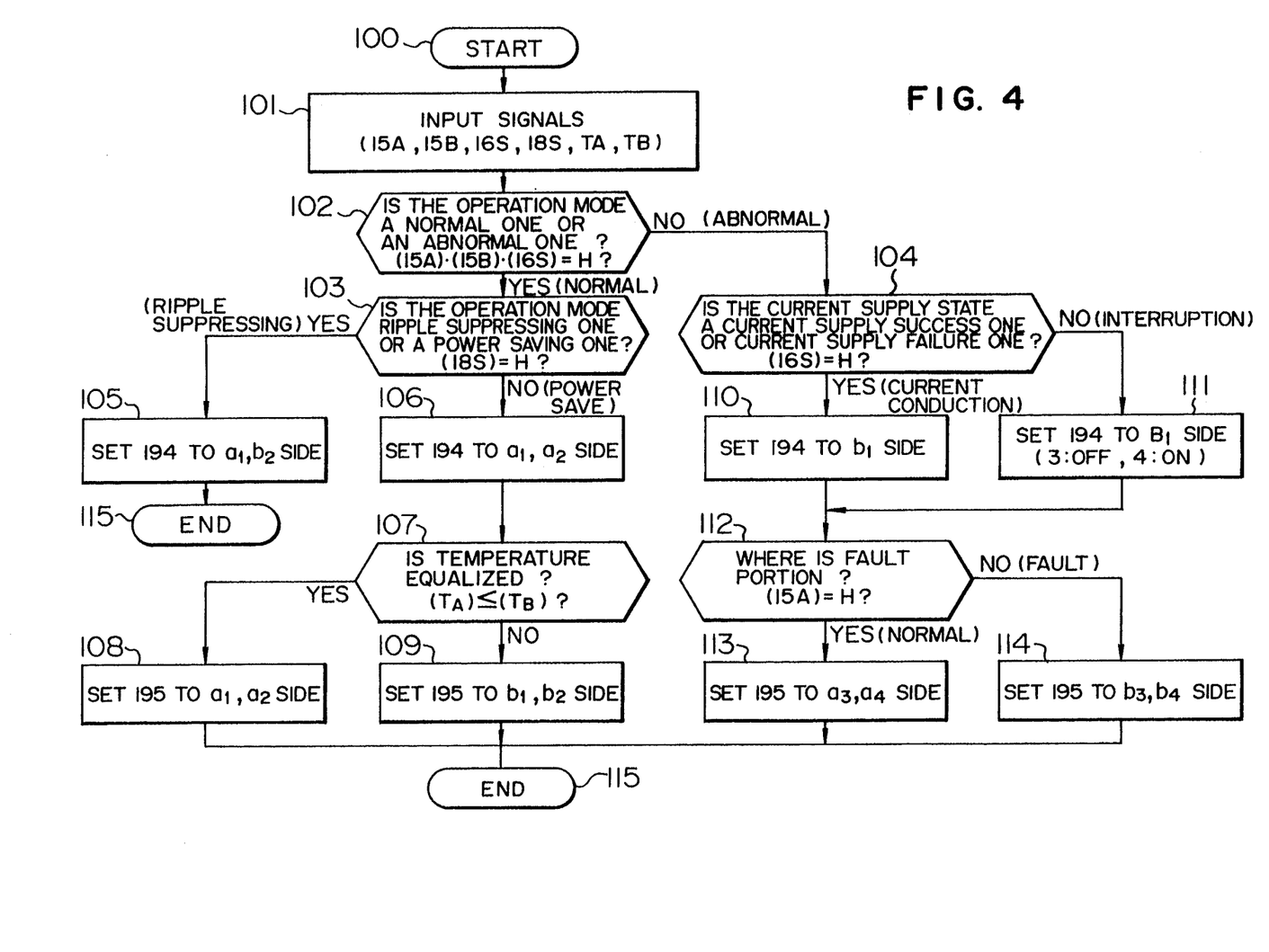
FIG. 4 is a flow chart showing an arithmetic operation process in the mode determining section.

The calculating process in the mode determining section 193 will be described with reference to the flow chart of FIG. 4.

When an elevator operating command (not shown) is generated, in step 101, fault signals 15A and 15B (signal level at the fault time: Low, hereinafter abbreviated to "L"), a power supply failure signal 16S (signal level at the power supply failure time: "L"), a mode set signal 18S (signal level in the case of the ripple suppression operation: High, hereinafter abbreviated to "H") and motor temperature signals $T_A$ and $T_B$ are input. An operation mode is determined on the basis of these signals, so that a function corresponding to the operation mode is selected.

In step 102, the operation mode is distinguished between a normal operation mode and an abnormal (rescue) operation mode. This distinction is based on the result of ANDing between the fault signals 15A and 15B and the power supply failure signal 16S. When the ANDing results "H", the operation mode is determined to be a normal operation mode and the situation of the routine goes to step 103. When, on the contrary, the ANDing results "L", the operation mode is determined to be an abnormal (occurrence of a fault or a power supply failure) operation mode and the situation of the routine goes to step 104.

The case where the operation mode is determined to be a normal operation mode and the situation of the routine goes to the step 103 will be described hereunder. In the step 103, the operation mode is determined between the ripple-suppressing operation mode and the power-saving operation mode. This determination is performed based on the mode set signal 18S. When the signal 18S is "H", the operation mode is determined to be a ripple-suppressing operation mode and the situation of the routine goes to step 105. That is, in the step 105, the switching direction in the mode selecting section 194 is set to the $a_1$, $b_2$ side.

As a result, the function $F_3$ for the ripple-suppressing operation is selected.

When, on the contrary, the signal 18S is "L", the situation of the routine goes to step 106 and the switching direction in the mode selecting section 194 is set to the $a_1$, $a_2$ side. As a result, the functions $F_1$ and $F_2$ for the power-saving operation are selected.

Then, the allocation of the selected functions $F_1$ and $F_2$ for controlling the driving systems is determined.

For example, the motor controlled by the function $F_1$ has a higher torque generating rate than that of the motor controlled by the function $F_2$. Accordingly, there is a high probability that the temperature of the motor controlled by the function $F_1$ is higher.

Therefore, the functions $F_2$ and $F_1$ are respectively selected for the high-temperature motor and the low-temperature motor to attain temperature equalizing.

When the relationship $T_A \leq T_B$ is valid in step 107, the switching direction in the driving system selecting section 195 is set to the $a_1$, $a_2$ side (step 108) so that the function $F_2$ low in the torque generating rate and the function $F_1$ high in the torque generating rate are respectively selected for the driving system including the motor 6B and the driving system including the motor 6A because the temperature of the motor 6B is higher than the temperature of the motor 6A.

When, on the contrary, the relationship $T_A \leq T_B$ is invalid in the step 107, the switching direction in the driving system selecting section 195 is set to the $b_1$ $b_2$ side (step 109) so that the function $F_2$ and the function $F_1$ are respectively selected for controlling the driving system including the motor 6A and controlling the driving system including the motor 6B, conversely.

The aforementioned process corresponds to the normal operation mode.

The case where the operation mode is determined as an abnormal operation mode on the basis of the judgment in the step 102 will be described hereunder.

In the step 104, the current supply state is determined between a current supply success state and a current supply failure state. When the state is determined to be a current supply success state (16S=H), the switching direction in the mode selecting section 194 is set to the $b_1$ side (step 110). When the state is determined to be a current supply failure state (16S=L), on the contrary, not only is the switching direction in the mode selecting section 194 set to the $b_1$ side but also the procedure (step 111) of opening the contactor 3 and closing the contactor 4 to switch the power source over to the non-utility generation facility 2 is carried out.

Then, in step 112, the fault portion is detected. That is, a judgment is made as to whether one driving system constituted by the power converter 5A and the motor 6A is normal or not. When the fault signal 15A is "H" (normal), the switching direction in the driving system selecting section 195 is set to the $a_3$, $a_4$ side (a step 113). When the fault signal is "L" (one driving system is abnormal), on the contrary, the switching direction in the driving system selecting section 195 is set to the $b_3$, $b_4$ side (step 114).

As a result, the functions $F_4$ and $F_5$ are respectively selected for the normal driving system and the abnormal driving system. Then, this routine is terminated. Although the case where both of the driving systems are abnormal is not considered in this flow chart, it is a matter of course that the procedure of stopping the elevator must be provided in a flow portion not shown.

Figure 5:
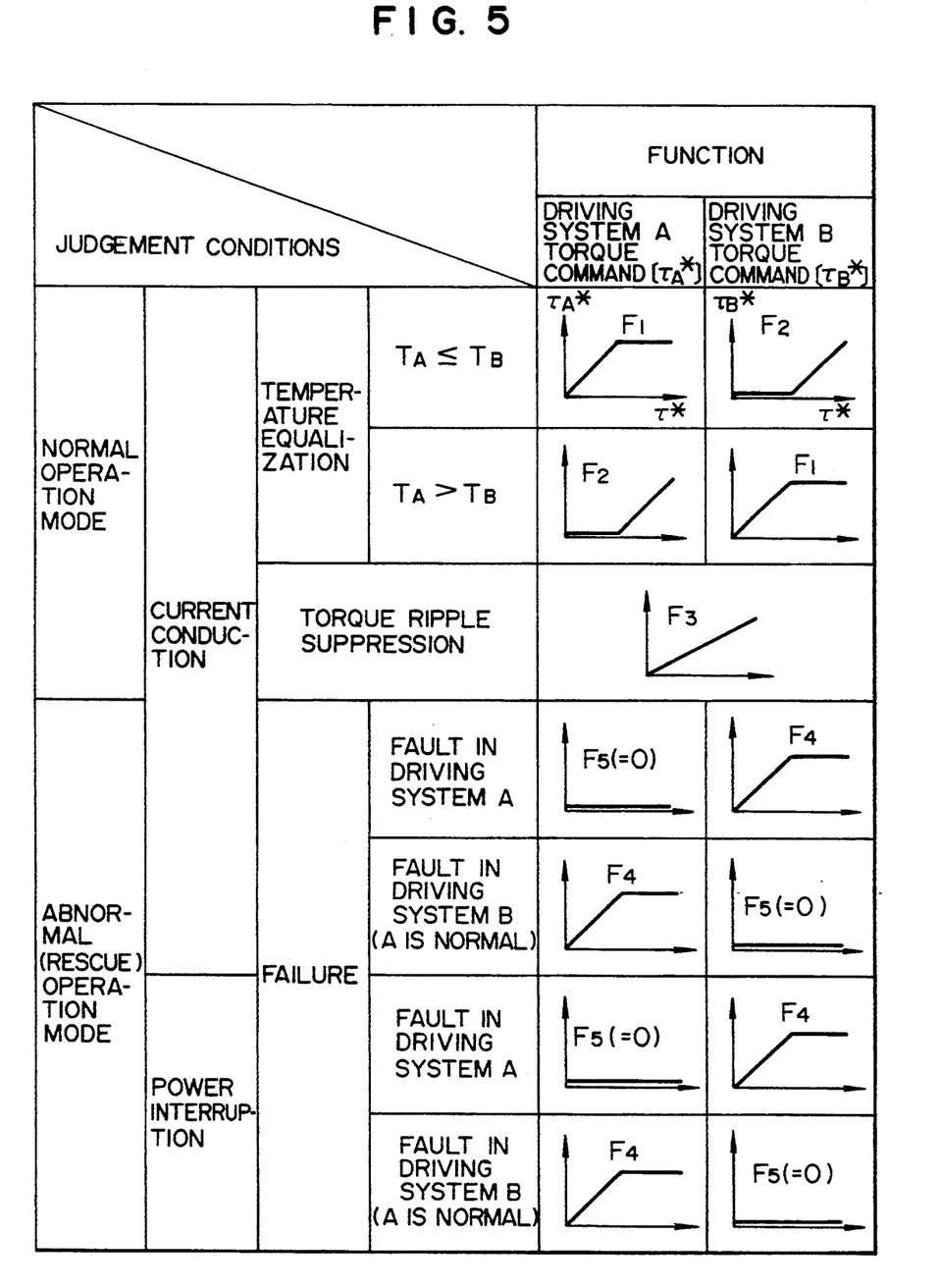
FIG. 5 is a table of function versus judging condition.

FIG. 5 shows functions allocated to the respective driving systems, classified by the judging condition. These functions expresses torque commands $\tau_A$ and $\tau_B$ allocated to the driving systems A and B when a required torque $\tau^*$ is taken as the abscissa in each of the graphs.

Returning to FIG. 1, the vector control arithmetic operation section 196 calculates quantities $i_A^*$, $\omega_A^*$ and $\theta_A^*$ for vector-controlling the driving system A on the basis of the torque command $\tau_A^*$ and the velocity signal $\omega_r$. Further, the vector control arithmetic operation section 196 calculates quantities $i_B^*$, $\omega_B^*$ and $\theta_B^*$ for vector-controlling the driving system B on the basis of the torque command $\tau_B^*$ and the velocity signal $\omega^r$. Then, the vector control arithmetic operation section 196 feeds the calculated quantities to the PWM controller 20.

Here, the phase command for the driving system B is fed to the PWM controller 20, as a value $\theta_B^* + \theta_S$ obtained by adding the phase difference $\theta_s$ (=30°) provided in the phase difference setting section 197. The PWM controller 20 forms a current control system from the vector control quantities $i_A^*$, $\omega_A^*$ and $\theta_A^*$ and the feedback current $i_A$ and generates a PWM signal $P_A$ for controlling the driving system A on the basis of the result. Further, the PWM controller 20 generates a PWM signal $P_B$ for controlling the driving system B on the basis of $i_B^*$, $\omega_B^*$, $\theta_B^* + \theta_S$ and $i_B$. The gate amplifier 21 generates gate pulse signals $P_{AG}$ and $P_{BG}$ on the basis of the PWM signals $P_A$ and $P_B$ to drive the power converters 5A and 5B. As a result, the respective motors generate torques on the basis of the selected functions to thereby drive the elevator.

Figure 6A:
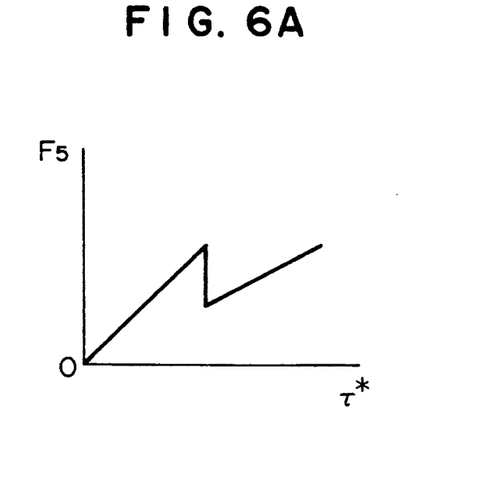
FIGS. 6A, 6B and 6C are graphs showing torque distribution in another embodiment of the present invention.
Figure 6B:
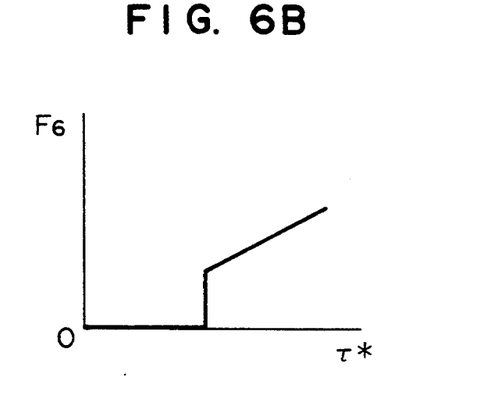
Figure 6C:
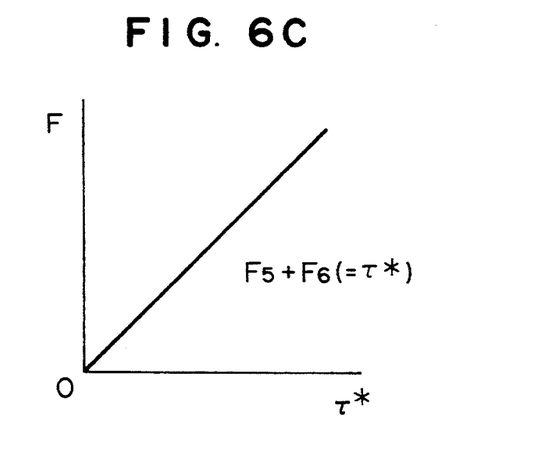

It is to be understood that the torque allocation in the power-saving operation mode is not limited to the aforementioned embodiment, but the present invention can be applied to the case where the torque may be allocated equally in the region in which the elevator is driven by two motors as shown in FIGS. 6A through 6C. This case is particularly adapted for the aforementioned phase difference operation.

Further, the elevator may be operated by determining whether both driving systems are used or whether one of the driving systems is used, just before the operation of the elevator, by calculating the quantity of torque necessary for the operation of the elevator in advance on the basis of the load imposed on the elevator cage and the direction of the running thereof so that use of one of the driving systems can be selected when the torque quantity is expected to be no larger than a predetermined value and that use of both the driving systems can be selected when the torque quantity is expected to be larger than the predetermined value.

Further, functions allocated at the time of the starting-up of the motors may be switched alternately to attain temperature equalizing.

It is a matter of course that the temperature detecting method is not limited to the method of directly measuring the rising of device temperature, but the device temperature may be measured indirectly. For example, current or power quantities supplied to motors may be detected and then converted into temperature rising quantities.

The temperature detector may measure the number of times of driving the respective motors.

The mode setter 18 for setting the operation mode to either the vibration-suppressing operation mode or the power saving operation mode may use a method in which the change of velocity (equivalent to cage acceleration) contained in the velocity signal is calculated so that the operation mode is determined as a vibration-suppressing operation mode when the change of velocity becomes large.

Although this embodiment has shown the case where two motors 6A and 6B are formed by packing two pairs of stator windings and rotors in one motor body, it is to be understood that the present invention is not limited thereto and that the present invention can be applied to the case where a tandem type motor formed by connecting two motors may be provided as shown in FIG. 1C.

Further, a motor of the type constituted by one rotor and two stator windings may be used, or a six-phase type motor may be used. In this case, it is preferable that power from two power converters having phases shifted from each other by an electric angle 60° is supplied to the two three-phase windings having phases shifted from each other by an electric angle 60° in the former motor, and that power from two power converters having phases shifted from each other by an electric angle 60° is supplied to the two windings (which are classified into three phases) having phases shifted from each other by an electric angle 60° in the latter motor.

In the aforementioned embodiment, the elevator system is provided as a multi-drive system constituted by a plurality of power converters and a motor (or motors) supplied power from the power converters. Accordingly, not only can the capacity of the system be enlarged easily but allocation of output power from the plurality of power converters can be determined variably. Accordingly, the embodiment has the following effects. 1) Because the elevator is driven by the minimum number of motors on the basis of the required torque, a power-saving operation can be carried out. 2) Because equalizing of the temperatures of the respective motors or power converters is attained, the rising of temperature can be minimized. 3) Because controlling is made to form a phase difference between the power converters, torque ripple produced in the motors can be suppressed to improve riding comfort on. 4) Because only one of the driving systems can be operated at the time of power supply failure, the capacity of electric source equipment adapted for power supply failure can be reduced. 5) Because excellent torque control based on vector arithmetic operations can be made in all the operation modes, riding comfort can be provided.

According to the present invention, saving of electric power consumption can be attained in a multi-drive elevator system or in a motor controlling system.

What is claimed is:

1. An elevator system comprising:
   a first driving system having an electronic frequency converter for outputting variable-voltage/variable-frequency AC power and an induction motor;
   a second driving system having a frequency converter for outputting variable-voltage/variable-frequency AC power and an induction motor;
   a common elevator driven by said first and second driving systems;
   a velocity command means;
   means for detecting the rotation velocity of said motors;
   means for controlling one of said first and second driving systems in accordance with a total torque command including a first torque command corresponding to the deviation between the velocity command and the detected velocity value and a second torque command corresponding to an unbalanced torque peculiar to the elevator operating system when the total torque command is less than a predetermined value; and
   means for keeping the torque command for one of said first and second driving systems constant while controlling the other of said first and second driving systems in accordance with the torque command correspondingly to the difference between the total torque command and the predetermined value when the total torque command is larger than the predetermined value.

2. An elevator system comprising:
   a plurality of power converters;
   an electric motor supplied with power from said power converters;

an elevator driven by said motor, said elevator having a corresponding elevator cage;

means for generating a velocity command for said motor;

means for detecting a rotation velocity of said motor;

means for generating a torque command having a component in accordance with a deviation between said velocity command and a detected value of said rotation velocity;

means for allotting power output from said plurality of power converters in accordance with the magnitude of said torque command using a plurality of predetermined different function modes;

means for selecting one of said predetermined function modes from among said plurality of predetermined different function modes immediately before operating said elevator by inputting an operation direction of said elevator system and a load condition of said elevator cage; and means for controlling said plurality of power converters with said allotment of power output according to said selected predetermined function mode by inputting said torque command during operation of said elevator.

3. An elevator system according to claim 2, wherein said plurality of function modes provide a first function mode for controlling two power converters in accordance with said torque command, and a second function mode for controlling one power converter in accordance with said torque command.

4. An elevator system according to claim 2, wherein said electric motor includes a plurality of electric motor units supplied with power from said power converters, and one of said plurality of function modes provides a function for maintaining one of two motor units at a constant value in accordance with said torque command, and the other of the two motor units is adjusted in accordance with said torque command.

5. An elevator system according to claim 2, wherein said electric motor includes a plurality of electric motor units supplied with power from said power converters, and one of said plurality of function modes provides a function for controlling the number of said motor units and said power converters in operation in accordance with the magnitude of said torque command.

6. An elevator system according to claim 2, wherein one of said function modes provides a function for controlling one of said power converters in accordance with said torque command at a region below a predetermined reference value of said torque command, and a function for controlling two power converters in accordance with said torque command at a region exceeding said predetermined reference value of said torque command.

7. An elevator system having a plurality of power converters, an electric motor supplied with power from said power converters, and an elevator driven by said motor, comprising:

means for generating a velocity command for said motor;

means for detecting a rotation velocity of said motor;

means for generating a torque command having a component in accordance with a deviation between said velocity command and a detected value of said rotation velocity;

means for allotting power output from said plurality of power converters in accordance with the magnitude of said torque command using a plurality of predetermined different function modes;

means for selecting one of said predetermined function modes from among said plurality of predetermined different function modes immediately before operating said elevator; and means for controlling said plurality of power converters with said allotment of power output according to said selected predetermined function mode by inputting said torque command before operation of said elevator, wherein one of said function modes provides a function for controlling one power converter in accordance with said torque command at a region below a predetermined reference value of said torque command, and a function for maintaining one power converter at a constant value at a region exceeding said predetermined reference value of said torque command and controlling the output of another power converter in accordance with the amount said torque command exceeds said predetermined reference value.

8. An elevator system according to claim 2, wherein one of said function modes provides a function for controlling two power converters having a phase difference therebetween in accordance with said torque command.

9. An elevator system according to claim 2, further comprising means for detecting a power supply failure, and means for connecting one of said power converters to an auxiliary electric power source in response to the operation of said power supply failure detection means.

10. An elevator system having a plurality of power converters, an electric motor supplied with power from said power converters, and an elevator driven by said electric motor, comprising:

means for generating a velocity command;

means for detecting a rotation velocity of said electric motor;

means for generating a torque command according to the difference between said velocity command and said rotation velocity detected by said rotation velocity detecting means;

means for allotting power output of said plurality of power converters with respect to the magnitude of said torque command through either of a first function made for allotting a larger power output and a second function made for allotting a smaller power output;

means for selecting one of said first and second function immediately before operating said elevator to equalize an average torque load allotment of the motor; and means for controlling said plurality of power converters through said allotment of power output according to the selected function mode by inputting said torque command before operation of said elevator.

11. An elevator system according to claim 10, wherein said function mode selecting means selects a function mode such that said torque allotment of said electric motor is switched for successive operations of said elevator.

* * * * *